United States Patent [19]

Porath et al.

[11] 3,959,251

[45] May 25, 1976

[54] STABILIZED AGAR PRODUCT AND METHOD FOR ITS STABILIZATION

[75] Inventors: Jerker Olof Porath; Jan-Christer Janson, both of Uppsala, Sweden

[73] Assignee: Exploaterings Aktiebolaget T.B.F., Uppsala, Sweden

[22] Filed: June 10, 1974

[21] Appl. No.: 477,746

Related U.S. Application Data

[63] Continuation of Ser. No. 155,816, June 23, 1971.

[30] Foreign Application Priority Data

June 25, 1970 Sweden............................ 8819/70
June 3, 1971 Sweden............................ 7180/71
June 10, 1971 Sweden............................ 7549/71

[52] U.S. Cl.............................. 260/209 R; 195/1.5; 260/112 R
[51] Int. Cl.²......................................... C07H 15/08
[58] Field of Search............................... 260/209 R

[56] References Cited
UNITED STATES PATENTS 3,507,851  4/1970  Ghetie et al.................. 260/209

*Primary Examiner*—Johnnie R. Brown
*Attorney, Agent, or Firm*—Young & Thompson

[57] ABSTRACT

The present invention relates to agar products for separation purposes, e.g. in biochemistry, and a method for preparing such a product. The product is chiefly characterized in that the agar or gel forming fractions prepared from agar is preferably bead-shaped and is made by cross-linking to be practically completely insoluble in water and strong alkali and, if desired, is also made practically sulfate-free by wholly or partially freeing it of carboxyl ions giving it a very small capacity to adsorb basic matter. If desired, it can also be coupled to an enzyme or protein component. The method is basically characterized by treating the agar- or agarose particles in an aqueous slurry with e.g. epihydrin or similar substances whereby the reagent can, if desired, be dissolved in an organic solvent and the reaction is carried out in an alkaline milieu in the absence of oxygen and/or, if desired, in the presence of strongly reducing matter. The sulfate content in the product may then be lowered by alkaline hydrolysis, also under oxygen-free conditions, until the product's adsorption capacity for basic substances has decreased to or under the desired level. The product can then be decarboxylated, if desired.

3 Claims, 1 Drawing Figure

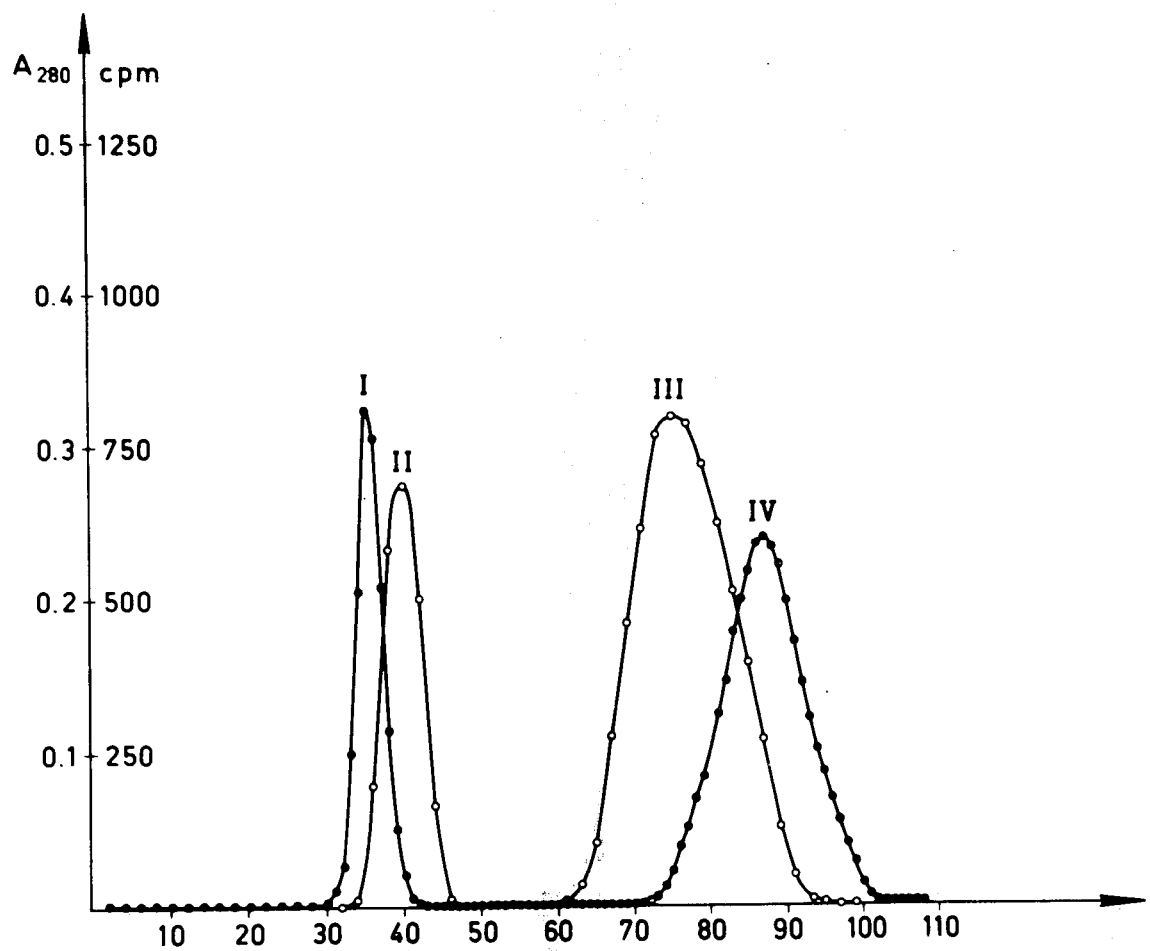

STABILIZED AGAR PRODUCT AND METHOD FOR ITS STABILIZATION

This is a continuation of application Ser. No. 155,816, filed June 23, 1971.

Agar is obtained by extraction of certain red algae and consists of a mixture of high molecular polysaccharides which, in extensive hydrolysis, yields galactose as a primary product. Because of its ability to form gels having a high water content, agar has found wide use in the fields of biochemistry and microbiology. A valuable property of agar is its resistance to microbial attacks.

An agar gel is formed when a hot water solution of agar is cooled, when the agar concentration exceeds a certain limit characteristic for different agar types and usually less than 1% by weight. It is assumed with gel forming that molecule networks are built where the polysaccharide chains are held together by hydrogen bindings. When heated up, the gel dissolves and is hydrolyzed with a strong acid or strong alkali, particularly during heating. An agar gel may also be obtained by allowing solid, dry agar particles to swell in the water. However, the thereby formed product obtains considerably poorer properties with respect to what is required in the present context.

A number of separation processes in biochemistry are based on the ability of agar gels to bind large quantities of water, especially processes based on diffusion of dissolved substances. Such procedures are called gel filtration, or even gel chromatography, molecular exclusion chromatography, molecular sieving chromatography or permeation chromatography. This chromatography technique, adapted for agar, comprises passing a mixture of substances having different molecular sizes through a bed of agar gel particles saturated with a water solution. The substances hereby migrate through the bed at different velocities; high molecular substances pass through the bed more quickly than low molecular ones. The work interval for the molecular sieving is determined by the network and the mutual size ratio of the molecules. A gel with low agar concentration may be used for separating high molecular substances mutually, whereas a gel with high agar concentration is more suitable for fractionating substances having smaller molecular dimensions.

The ideal molecular sieve ought to fill certain demands. For example, it ought not contain charged groups and it should be insoluble and chemically resistant. Common agar is markedly deficient in these respects.

It has now been discovered that agar contains a fraction, agarose, which has a significantly lower content of charged groups than the source material. Therefore, this fraction has found use as a molecular sieve and has better properties than agar. Agarose has also replaced agar in other fields where it is essential for the gel not to contain large amounts of charged groups chemically bonded in the gel substance.

An additionally improved product phase is obtained according to the patent specification No. 3,507,851 which describes cross-linking agarose with epichlorohydrin. In this way, cross-linked agarose is less soluble than the natural agarose and is also more resistant to alkali.

It is exceedingly important, particularly for technical applications, to obtain high flows in the molecular beds, thus allowing for the setting in of rapid diffusion equilibria. It is also extremely important to obtain a well defined flow front through the bed, or as close to a theoretical piston flow as possible. This is best accomplished by making the particles spherical; this has not been done previously with cross-linked agar gels.

The same properties which characterize the ideal molecular sieve are also desirable when the gel is to be used as source material for preparing ion exchangers and other adsorption agents and for preparing enzymes chemically bonded to a gel, and other biologically and chemically active gel materials as well as for preventing convection in a solution, e.g. during preparative electrophoresis.

The present invention relates to a product which fills the demands on molecular sieves better than previously known agar gel products. The invention also relates to a process for making this product with the agar being directly usable as source material without first requiring time-consuming and material-losing fractionating. According to the invention, the agar product may be obtained in the form of spherical particles having very small adsorption capacity and being insoluble in heat and alkali.

The present invention relates to products of cross-linked agar or agarose with significantly more advantageous properties than previous products and prepared in another manner which is important in the present context. The cross-linking may be effected with epihalohydrin, e.g. epibromohydrin or epichlorohydrin. In the cross-linking reaction with agar, both agarose and the other polysaccharides in the agar take part. It has been shown that if the cross-linking takes place in the absence of oxygen and, preferably, in the presence of a reducing agent, e.g. sodium borohydride, the brown coloring and partial decomposing of the agar, which normally occur in reactions in the alkaline medium that is required for the binding of the agar to epichlorohydrin, can be avoided. It has also been shown that cross-linking has stabilized the product to such an extent that it, via alkali treatment, e.g. autoclave treatment one or more times, can be made more or less sulfate-free. Also, if so desired, said agar product can be practically totally freed of the less desirable adsorption capacity, a great part of which is usually attributed to the product's sulfate content but which can, by the above described treatment, be reduced to zero in most of the substances found in nature without the total sulfur content of the product necessarily having to become zero. (See the list of values in Table 1.)

It has also been shown that, under certain conditions with considerably more advantageous results, cross-linking can be attained with bis-epoxides such as 1,3-bis-(2,3-epoxy-propoxy)butane. Even divinyl sulfone and other cross-linking vinyl compounds can be used for this purpose. It is finally added that chemical compounds which can be converted under the reaction conditions and course of reaction to e.g. epichlorohydrin or any other of the above given cross-linkers may also be used. Examples of such compounds are 1,3-dichloropropanol-2 (See Example 12) or 2,3-dichloropropanol-1 (see Example 13).

By varying the degree of cross-linking and, above all, the nature of the cross-linking molecule, molecular sieves can be obtained with a certain extent of variable molecular excluding boundaries, thus with a much higher value than what was previously possible. This is illustrated on FIG. 1 which shows examples of molecular sieving on 2% cross-linked and hydrolyzed agar.

The curves on the figure refer to the following:

I. Tobacco mosaic virus with a particle weight of about $2 \cdot 10^8$ and in continuous form;

II. Adeno-virus Type 3 with a particle weight of about $1.8 \cdot 10^2$ and in spherical form;

III. Poliovirus with a particle weight of about $6.8 \cdot 10^6$ and in spherical form, and IV. Satellite Tobacco Necros Virus with a particle weight of about $2 \cdot 10^6$ and in spherical form.

The products according to the invention may be advantageously based on swollen gels in bead form and with high water contents. By beginning with a fully swollen in water gel, the degree of cross-linking will be restricted but simultaneously, and in a desirable manner, controllable and reproducible since the gel can be easily penetrated by molecules intended for the cross-linkings. In most cases, 90% or more water appears to be a suitable water content. It is important that the form of the gel particles is not changed during treatment according to the invention. However, it is also important that by using the method according to the invention, the cross-linked gel be insoluble even at higher temperature and in alkaline solution. Thus, a bed of the product according to the invention can be sterilized by autoclave heating which, in many cases, is of decisive importance. In addition, the insolubility is most advantageous if the agar product is to be used e.g. for purifying pharmaceutical products, especially for injection purposes where contaminated matter, such as antigen substances, must not be released. Furthermore, the agar product remains transparent, colorless or white. This shows that no undesirable disintegration of the agar product occurs during treatment.

In order to further clarify the invention, a number of examples are given below. However, reagents and amounts mentioned may, of course, be varied within the framework of the invention.

EXAMPLE 1

A suspension of swollen agar- or agarose particles, preferably bead-shaped, prepared in a known per se manner from a homogeneous aqueous solution of the agar or agar product used — even so-called crush may be used — in 0.5 M sodium hydroxide solution was poured in with 10 ml epichlorohydrin per 100 ml swollen gel mass. The mixture was heated up to 60°C and kept at this temperature for 2 hours in nitrogen gas atmosphere, or in the presence of sodium borohydride during effective agitation. The cross-linked gel was washed with water to a neutral reaction. To effect hydrolysis of sulfate esters, the cross-linked agar- or agarose gel was boiled or autoclaved with a volume equal to 2 moles sodium hydroxide solution for 2 hours in the presence of sodium borohydride.

EXAMPLE 2

The cross-linking was effected according to Example 1 but with the difference that instead of an aqueous solution a solvent of 50% by volume ethanol and 50% by volume water was used. The epichlorohydrin was completely dissolved in this mixture. The resulting cross-linked gel was insoluble in boiling water and could be autoclaved in 1 M sodium hydroxide at 120°C for 1 hour without noticeable change.

EXAMPLE 3

The cross-linking was effected according to Example 1 with the difference that the solvent used for the epichlorohydrin was anhydrous ethanol. The product corresponded to the agar gel in Example 2 with respect to the solubility.

EXAMPLE 4

The cross-linking was effected in 50% by volume dioxane and 50% by volume water, otherwise under the same conditions as in preceding examples. A product was obtained which was insoluble and stable in heat and alkali.

EXAMPLE 5

The cross-linking was effected in the same way as in preceding examples but with epibromohydrin instead of epichlorohydrin. A product with the same appearance is obtained which is insoluble and stable in heat and alkali.

EXAMPLE 6

The cross-linking was effected in the same way as in Example 3 but with epibromohydrin. A similar product was obtained.

EXAMPLE 7

The cross-linking was effected in the same way as in Example 4, but with epibromohydrin. A similar product was obtained.

EXAMPLE 8

The cross-linking was effected according to Example 1 but with 1,3-bis-(2,3-epoxypropoxy)-butane instead of epichlorohydrin. This bis-epoxide is, in contrast to epichlorohydrin, miscible with water. A product was obtained which was insoluble and stable in heat and alkali and the original particle form was retained as in the other examples.

EXAMPLE 9

The cross-linking was effected as in Example 8 but with the water being replaced by a blended solvent of 50% by volume water and 50% by volume ethanol, and with the bis-epoxide 1,4-bis-(2,3-epoxypropoxy)-butane which is more slightly soluble in water.

EXAMPLE 10

The same method was used as in Example 9, but with the difference that the cross-linking was effected in absolute ethanol.

EXAMPLE 11

The cross-linking was effected as in Example 9, but with the difference that the solvent was constituted of 50% by volume ethanol and 50% by volume dioxane.

EXAMPLE 12

The cross-linking was effected according to Example 3, but the epichlorohydrin was replaced by 1,3-dichloropropanol-2.

EXAMPLE 13

The cross-linking was effected according to Example 3, but the epichlorohydrin was replaced by 2,3-dichloropropanol-1.

EXAMPLE 14

The cross-linked gel was prepared according to Example 3, but with the difference that the autoclaving was effected in a solution of 1 M sodium alcoholate in anhydrous ethanol.

EXAMPLE 15

100 ml swollen bead-shaped agar was equilibrated by washing with 1 M soda solution. 5 ml divinyl sulfone was added in 50 ml soda solution. The gel assumed a milky appearance. The suspension was heated to 50°C for ½ hour and the gel was then washed on a filter. A sample was taken out and heated to 100°C. No dissolution could be observed and the gel pellets retained their form. The gel was then transferred into 1 M NaOH solution containing 0.5% $NaBH_4$. The thereby treated gel retained the spherical particle form and a packed bed showed excellent flow properties.

In order to show that the agar beads can be cross-linked, even as liquid particles, and retain their spherical form, the tests described below were carried out. These tests also show that it is not essential to separate the spherical agar particles, after they have been formed, before the cross-linking is effected.

EXAMPLE 16

500 ml of 6% agar solution in 0.5 M NaOH with 2.5 g $NaBH_4$ was suspended at 75°C in 600 ml ethylene dichloride containing 20 g polyvinyl acetate as a stabilizer. The agitation was controlled so that particles of suitable size (50–250 $\mu$) were obtained. 50 ml epichlorohydrin was then added and agitation was continued at 60°C for 2 hours. After cooling, the gel particles were freed from the emulsifier by careful washing with acetone. The beads were then transferred in water and autoclaved as in Example 1.

To compare the adsorption properties of the new products with that of the source material and the agarose, the tests were carried out as follows:

The gel was packed into a bed 0.90 cm² in cross section and 2.5 – 3.5 cm height in chromatography tubes. The bed was equilibrated with 0.01 M ammonium acetate buffer pH 4.1. Cytochrome C (0.1% solution in the same buffer) was introduced until the influent and the effluent displayed the same color strength. The bed was washed with buffer solution until no further cytochrome was eluted. Displacement of the adsorbed cytochrome was effected with 0.15 M ammonium acetate buffer, pH 4.1. The amount of cytochrome was measured in the eluate; the determination was effected with the adsorptivity 1.54 cm² mg⁻¹ at 280 nm. The gel was washed after each test by 0.5 M sodium hydroxide and then with distilled water until the eluate displayed neutral reaction. The gel was freeze-dried and weighed.

In the table, the adsorption capacity for cytochrome C is given, as well as the sulfur content of some dissimilar agarose gels and agar, in part untreated, in part treated according to the invention (Example 1).

TABLE I

| Type of gel | Adsorption capacity (mg cytochrome C/mg gel) | | %S | |
|---|---|---|---|---|
| | Untreated | Treated | Untreated | Treated |
| Sepharose 2B | 0.124 | 0.007 | 0.179 | 0.028 |
| Sepharose 6B | 0.102 | 0.005 | 0.182 | 0.026 |
| Bio-Gel A 1.5 | 0.080 | 0.008 | 0.118 | 0.021 |
| Difco Bacto Agar 6% | 0.240 | 0.060 | 0.371 | 0.049 |

Sepharose 2B and Sepharose 6B are agaroses from Pharmacia Fine Chemicals AB, Uppsala. Bio-Gel A 1.5 is agarose from Bio Rad Lab., Richmond, USA, and Difco Bacto Agar 6% is made by Difco Lab. Inc., Detroit.

It is to be emphasized that the form stability of the product according to the invention is much greater than that of the agar, or agarose, which is not cross-linked. The products according to the invention retain their form unchanged, even when heated or in an alkaline solution. This contrasts to previously known agar products in pellet form. The present products not only withstand strong alkali and higher temperatures, but can also be freeze-dried, and freeze-dried products may be reswelled to spherical particles by treatment with water.

According to the invention, cross-linked and desulfurized agar cannot be considered a product where cross-linked agarose is included in an otherwise unreacted mass. Accurate examinations indicate that both agaropectines and other polysaccharides in the agar appear to have taken part in the cross-linking process.

First, with the treatment according to the above, a large portion of the sulfate group in the agar is removed whereas most of the carboxyl groups remain. However, under certain circumstances, these groups can cause adsorption conditions which appear to have a disturbing effect, e.g. during molecular sieving.

But, according to the present invention, the carboxyl content can be reduced to practically zero, whereby the total adsorption capacity is further reduced considerably. Thus, products have been prepared with an adsorption capacity which, by decarboxylation, has been reduced to 10% of that of the products which are desulfated only. The product is thereby freed, before or after desulfurization, either entirely or almost completely from carboxyl groups since it is transferred in the reaction-inclined form and then brought to react with strong reducing agents such as metal hydrides, e.g. hydrides of lithium, magnesium, aluminium or boron, or derivatives thereof, boranes, etc., whereby the adsorption capacity of the product is further reduced.

Thus, particles of cross-linked agar or agar derivatives may be treated with e.g. aluminium- or borohydride, or derivatives thereof, particularly lithium-aluminium hydride in a solvent where the agar or agar derivative is swellable and with which the hydride does not react or reacts so slowly that the reaction with the agar is not affected. The reduction is promoted by elevated temperature. It is demanded of this treatment that it will not cause decomposition of the particles or alter their form.

It has proved difficult to considerably reduce the adsorption capacity by direct treatment of the agar product with $LiAlH_4$ in ether, dioxane, etc. since the solvent plainly fails to penetrate the agar to the required extent. Suitable ways of carrying out the treatment have proved to be to transfer the agar in a reaction-inclined form e.g. by first swelling the particles in water and then washing them with an organic solvent of intermediate polarity, e.g. n-propanol, and then with dioxane. Other solvents such as tetrahydrofuran may also be used. The agar or agar derivative can first be converted to ester form, e.g. acetate. In this way, an intermediate product is obtained which swells better in dioxane and other ethers.

It has been proved preferable to effect the reduction at elevated temperature, preferably over 80°C. This appears to be a result of the molecule structure opening more at the higher temperature, presumably because the hydrogen bindings break up during polymer forming. In addition, at high temperature, the solubility and inclination to react of the hydrides increases. Therefore, the use of ethers with high boiling points is preferred.

The reduction, e.g. lithium-aluminium hydride treatment, can be effected directly in agar or agarose without a previous desulfurization. In this way, the sulfate groups might be split off and the carboxy groups reduced. Of course, cross-linked agar or agarose may also be treated, after they have been freed from sulfate groups by alkaline hydrolysis in a reducing milieu. In the latter case, the adsorption capacity is reduced only by reduction of carboxyl groups. If the reduction is effected on cross-linked acetylated agar or agarose, the remaining acetate group must be removed by alkaline hydrolysis preferably in the presence of sodium borohydride. To attain satisfactory results, a significant excess of reducing agent is required. By using a quantity of $LiAlH_4$ which is greater than ½ the amount by weight of dry agar substance, a product is obtained with a very low adsorption capacity.

In order to further elucidate the invention, two more examples will be given below.

EXAMPLE 17

300 ml cross-linked, acetylated, 6% agar in bead form was put into a 500 ml round-bottomed flask, and 250 ml dioxane was then added. 10 g $LiAlH_4$ was added in portions during careful agitation with a continuous supply of nitrogen gas over the reaction mixture. No reaction or a very weak reaction was obtained. But when the temperature was raised to 45°C, a strong reaction occurred. The mixture was cooled temporarily but then raised to 60°C and kept at this temperature for 1 hour. Then it was raised to 80°C for 2 hours. The reaction was then interrupted with ethyl acetate accompanied by an addition of water, thus cooling the mixture. 1 M hydrochloric acid was added, during refrigeration, until all the deposit was dissolved. The beads were washed quickly with ice-cold 0.1 M hydrochloric acid and then with water.

Deacetylation then took place with 1 M NaOH containing 0.1% $NaBH_4$ at 80°C for 15 minutes. The beads were finally washed with water.

The product prepared in this way adsorbed p.01 mg cytochrome C (calculated per mg dry gel) in 0.001 M ammonium formate at pH 3.8 whereas the source material under the same conditions adsorbed 0.12 mg cytochrome C.

EXAMPLE 18

25 ml 2% cross-linked, desulfurized agar in bead form, according to the above, was swelled in water, washed first with 100 ml n-propanol and then with 200 ml dioxane. 0.5 g $LiAlH_4$ was added to a suspension in 25 ml dioxane. The mixture was heated to 90°C for 20 minutes and then cooled to 0°C when the reaction was interrupted with ethyl acetate and water (ice). The mixture was acidified by the addition of 1 M HCl to pH 2 and the beads were washed first with ice-cold 0.1 M HCl and then with large amounts of water.

The prepared product adsorbed 0.013 mg cytochrome C per mg dry gel substance, corresponding to about 10% of the adsorption on the original cross-linked agar.

An agar cross-linked, desulfated and/or decarboxylated according to the above can advantageously serve as a matrix in insoluble protein-agar derivative.

It is known that proteins can be chemically united with insoluble polymers such as cellulose, cross-linked dextran, etc. while either wholly or partially retaining their biologically important properties, enzymatic activity, ability to selectively bind other proteins and other substances, etc. The preconditions are that the chemical fixing is effected under mild conditions and that the polymer fills certain demands.

Protein-polymer derivatives have already begun to find use in practice and their importance in different fields can be expected to increase rapidly. There are already commercially available enzymes bonded to cellulose or synthetic polymers and they can be used for preparative or analytical, biochemical reactions, e.g. the hydrolysis of esters, breading down of proteins to peptides and amino acids, oxidation of carbohydrates, etc. Antigen proteins may be bonded to polymers to form adsorbants for corresponding antibodies. Enzyme inhibitors of polypeptide or protein nature can be bonded to polymers to form specific adsorbants for the enzymes against which the inhibitors are directed.

It is obvious that such specific adsorbants provide very effective methods of producing in pure form medically, or in another way biologically active matter found in nature, e.g. for purifying vaccines. However, all previously known protein polymers are inherent with different deficiencies. According to the present invention, these deficiencies are remedied and an unobjectionable product is produced. Two factors are most important here:

a. the structure and properties of the matrix of the polymer used, and b. the method for coupling the protein to the matrix.

It is quite important to choose a suitable polymer for fixing the biologically active protein. This polymer must be chemically inert and mechanically stable. It ought to exist in particle form which can be effectively and quickly penetrated by proteins. Enzyme-protein complexes and other bio-polymer-protein complexes must be able to form and be dissolved within the gel and provide the most ideally possible piston flow.

It is evident from these requirements that the polymer must be hydrophilic and consist of a macromolecular network of a very open nature. Moreover, the polymer must be able to be brought into a chemically active form which allows chemical coupling of protein under mild conditions.

The used to date gel forming polymers have all the shown deficiencies in one or more respects. Cellulose often has, like other synthetic polymers, an unsatisfactory permeability for forming protein-protein complexes. Co-polymers between ethylene and maleic anhydride contain a very high concentration of carboxyl groups whereby the polymer receives strong ionexchanging properties. This is a significant drawback in specific adsorption and also affects enzyme reactions.

Agar also has ionogenic groups. However agarose, one of the polysaccharide components in agar, has a lower concentration of ionogenic groups and is therefore more suitable as a matrix for polymer-bonded proteins. Agar and agarose form mechanically stable gels even when the matrix is of such low concentration that high molecular proteins and even viruses can penetrate the gel. Proteins may be bonded to agar or agarose by e.g. the cyanogen bromide method described in Nature 214, 1302(1967) and 215, 1491(1967) or with the oxirane method, Swedish patent application 843/70, without the simultaneous introduction of ionogenic groups. However, both agar and agarose have the serious drawback of not being completely insoluble. It is assumed that the coherence in the gel is due to hydrogen bridges between the polymer chains. These bridges are dissolved and are rebuilt obviously spontaneously and often, and therefore leakage of polysaccharide occurs continuously. In certain milieus suitable for splitting protein-protein complexes which are often formed with hydrogen bindings, the solubility of the agar can be increased catastrophically. When protein is fixed, the solubility may increase even more.

Preparing a substance or substance class in pure form, here designated $S_j$, from a mixture of the components $S_1, S_2 - - S_j - S_n$, occurs by removing all the components $S_i$, where $i \neq j$. If only $S_j$ forms a complex with a protein P, $S_j$ can principally be isolated by biospecific adsorption followed by desorption. P is fixed for this purpose to a matrix M; a specific adsorband is formed, here called MP. When MP is brought into contact with the mixture $S_1 - S_n$, the insoluble complex or complexes $MPS_j$ are formed which can be freed from the other components $S_i$ by decanting or washing on a filter. In the next stage, $S_j$ is freed $$MPS_j \rightarrow MPS + S_j$$

whereby MP is regenerated.

$S_j$ is often quite strongly bonded to MP particularly where a high grade specificity exists. Therefore, dissociation or releasing of $S_j$ can constitute the critical moment in this form of specific purification. Both $S_j$ and MP shall retain their properties. The protein P must not be denatured since the adsorption capacity would then be lost. Dissociation can often occur with so-called chaotropic ions, e.g. sulfocyanate or iodide in high concentrations, e.g. 3 M solutions, but agar and agarose are then dissolved in great amounts.

However, according to the present invention, an agar product can be prepared with most insignificant solubility and practically totally lacking in ionogenic groups, since cross-linking within agar has now been achieved with a special method. It has also been shown that these cross-linkings do not prevent the fixing of different types of proteins to the cross-linked agar with known per se methods. Thus e.g. a suitable coupling can be attained with the cyanogen bromide or oxirane methods, and even with other methods. The protein may e.g. be an enzyme whereby an "insoluble enzyme" is formed which, at the same time, is a specific adsorbant for all inhibitors and antibodies directed against the enzyme, as well as other substances which build complexes with the enzyme. Also, suitable organic chains may first be bonded to the agar. The protein is then coupled to these chains with the intention of preventing steric defects. Since practically all proteins P can form antibodies, a complex pair $PS_j$ may always be found which in principle fills the requirements. The protein P fixed at the cross-linked agar can be included in a protein complex of a higher order, e.g. in a virus or in a cell particle, such as a ribosome or a cell membrane fragment. The protein may also be composite, e.g. glycoprotein.

There is no sharp distinction between proteins and polypeptides. In the present application, the word "protein" is used in a general sense and even embraces polypeptides having high molcular weight, e.g. over 4000.

According to the invention, protein-agar products have been prepared which:
1. are insoluble in aqueous solutions where proteins are not hydrolyzed,
2. can be penetrated by proteins, polysaccharides, viruses and other high moleculr matter during the forming of reversible molecular complexes in the gel,
3. can be treated with hydrogen-binding splitting substances such as iodides, carbamid and guanidine without agar polysaccharides, with or without protein, being dissolved from the gel phase.

The protein-agar product is preferably prepared from agar, in bead form, which has been cross-linked and desulfated and, if desired, decarboxylated as described above. A protein-agar so prepared forms rapid-filtering beds where ionogenic groups disturbing the adsorption and enzyme reactions are eliminated from the native agar. The permeability in the protein-agar particles can be regulated by the concentration of agar in the water-swelled particles during the cross-linking.

It is particularly important that the agar matrix does not contain ionogenic groups, as adsorption and desorption shall take place with very low salt concentrations. An unspecific ion exchange adsorption can, under such conditions, completely spoil the biospecific fractionating and reduce the exchange to zero. The protein-agar's insolubility is especially important since the substances to be purified are for clinical use, e.g. for intravenous injection when immune reactions may occur. Leakage of enzymes, antigens, antibodies, etc. can jeopardize the analytical use of polymer-bonded proteins. All these complications are avoided with the use of the present invention.

In order to further elucidate and illustrate the invention, its application will be described in the examples below.

EXAMPLE 19

1 liter swollen, cross-linked, desulfated agarose beads according to the above was mixed in with 20 g cyanogen bromide dissolved in 50 ml water. After 2 minutes, 2 moles NaOH was added to pH 11–11.5. After 9 minutes, the gel was washed with about 2.5 l 0.5 M NaHCO₃ at 24°C.

50 ml of a solution containing 10 g concanavalin A dialyzed against 0.05 M sodium acetate buffer, pH 6.0, was added to the activated gel and the suspension was agitated for 2 hours at pH 8.0. The concanavalin-agarose gel was washed consecutively with 2 l of each of 0.5 M NaHCO₃ buffer at pH 8.0, distilled water, 0.3 M sodium formate buffer at pH 3.0 and 1 M with respect to NaCl, 0.05 M sodium acetate buffer at pH 6.0 containing 0.02% NaN₃ and 0.001 N Mg$^{+2}$ and Ca$^{+2}$.

A 6.3 × 1 cm bed was then packed by the protein gel, prepared according to the above, and a solution of glycogen, 2 mg/ml, introduced at a rate of 5 ml per hour. After about 10 hours, the bed had been saturated with respect to glycogen. The bed was washed with buffer, whereby the eluate gradually became totally free from glycogen. As the orcinol reaction was negative, it could be ascertained that no carbohydrate leaked out of the gel. The bed was washed with 0.1 M sodium formate buffer at pH 3.0 whereby about 35 mg glycogen was displaced from the bed.

In this example, the matrix M was cross-linked agarose, the protein P was concanavalin and $S_j$ was glycogen. $S_j$ can also be another polyglucane or a glycoprotein containing glycose.

EXAMPLE 20

100 mg bis-epoxide cross-linked, desulfated agar beads (dry weight 6% regarding matrix content) was suspended in 4 ml distilled water and was activated with 4 ml BrCN solution, 25 mg BrCN/ml, for 6 minutes at pH 11 and at room temperature. The activated gel was washed with cold 0.1 M sodium hydrocarbonate solution.

30 mg ribonuclease A was dissolved in 5 ml 0.1 sodium hydrocarbonate solution and was allowed to react with the activated gel at +4°C for 30 hours. The coupling product was carefully washed. The ribonuclease-agar gel contained 82 mg protein per gram gel. The enzyme was tested against different ribonucleic acid preparations. The activity was in the interval 25 – 50% of the free enzyme. This is a very satisfactory result considering the high molecular weight of the substrate and the fact that ribonucleic acid is a linear polymer, thus making permeability more difficult.

EXAMPLE 21

35 ml epichlorohydrin cross-linked, desulfated, bead-shaped agar was washed on a filter first with dimethyl sulfoxide and then with water. The gel was activated with BrCN in the same way as in Examples 1 and 2. 50 ml antilymphocyte globulin (ALG) was dissolved in 20 ml 0.5 M NaHCO$_3$ solution and added to the activated gel. The coupling was carried out in a refrigerated room for 24 hours. The ALG agar was then carefully washed with 0.5 M NaHCO$_3$, 0.1 M NaAc buffer at pH 3.9, 0.05 M Tris-HCl buffer at pH 8.5 and 0.05 M sodium phosphate buffer at pH 7.5. All the buffer solutions were 1 M with regard to NaCl. The gel was packed into a column.

5 ml sonicate of human lymphocytes was introduced in the column. After washing with phosphate buffer, pH 7.5, the adsorbed material was desorbed with 20 ml 1 M NaJ in the phosphate buffer. The solution was concentrated and analyzed. No carbohydrates were released from the column. The desorbed material was examined with a cytotox test and was found to consist of immunoactive leucocyte fragments.

EXAMPLE 22

8 ml settled, 1.3-dichloropropanol-2 cross-linked, desulfated, and LiAlH$_4$ reduced agar beads were treated with 10 ml 1 M NaOH containing 20 mg NaBH$_4$ and 2 ml 1.3-butanediol-diglycidyl ether under agitation at room temperature for 6 hours. The gel was then washed with distilled water and 0.2 M sodium hydrocarbonate buffer, pH 9.0.

100 mg soyabean trypsin inhibitor (STI) dissolved in 10 ml sodium hydrocarbonate buffer at pH 9.0 was added to the gel which was then allowed to stand at room temperature during agitation for 20 hours. The gel was washed first with the hydrocarbonate buffer and then with 0.1 M glycine buffer containing 1 M NaCl, at pH 3.0.

The gel was then transferred in 0.05 M Tris-HCl, pH 7.8, containing 0.5 M NaCl and 0.02 M Ca$^{+2}$ and packed in a column. A solution containing 0.2 mg/ml commercial trypsin was allowed to pass the bed. Inactive material passed through undelayed. The gel absorbed 3.5 mg active trypsin, which could be penetrated with 0.05 M glycine-HCl, pH 3.0, containing 0.5 M NaCl and 0.02 M Ca$^{+2}$.

The trypsin was adsorbed to the STI gel in a 1:1 ratio. The cross linking of the agar gel thus does not affect the capacity to form reversible complexes.

EXAMPLE 23 raw extract of bovine pancreas powder (from the pancreas of a cow) was introduced into a bed of STI gel according to Example 22. No trypsin activity passed the column before 50 ml extract was introduced. The gel was washed with Tris-HCl-buffer according to Example 22 and 0.1 M NaAC/HAc buffer, pH 4.5, was introduced, the cymotrypsin being displaced. The pH was then lowered by eluting with glycine buffer according to Example 22. 3.5 mg pure trypsin was displaced from the column. The unspecified adsorption was significantly far less than for a similar bed based on commercial agarose which was not cross-linked, desulfated and reduced.

The gel could be used an unlimited number of times without a noticeable reduction of the adsorption capacity. No releasing of the trypsin inhibitor could be ascertained.

The bed, as in Examples 19 to 22, had excellent flow properties.

What we claim is:

1. In a method of preparing spherical beads of cross-linked agar product, comprising forming spherical water-swollen beads of a member selected from the group consisting of agar and agarose, and then cross-linking said member with a member selected from the group consisting of bisepoxide, epihalohydrin and divinyl sulfone in an alkaline aqueous slurry of said beads; the improvement in which said cross-linking is conducted in a oxygen-free environment, and contacting said beads with a reducing agent during said cross-linking.

2. A method as claimed in claim 1, in which said reducing agent is selected from the group consisting of a hydride of lithium, magnesium, aluminum, boron and a combination thereof, and borane.

3. Spherical beads of cross-linked agar product produced by the method of claim 1.

* * * * *